United States Patent
Kurihara

(10) Patent No.: US 7,299,063 B2
(45) Date of Patent: Nov. 20, 2007

(54) WIRELESS COMMUNICATION SYSTEM, WIRELESS COMMUNICATION DEVICE AND WIRELESS COMMUNICATION METHOD, AND COMPUTER PROGRAM

(75) Inventor: Kuniaki Kurihara, Tokyo (JP)

(73) Assignee: Sony Corporation, Tokyo (JP)

( * ) Notice: Subject to any disclaimer, the term of this patent is extended or adjusted under 35 U.S.C. 154(b) by 820 days.

(21) Appl. No.: 10/601,673

(22) Filed: Jun. 24, 2003

(65) Prior Publication Data

US 2005/0099942 A1   May 12, 2005

(30) Foreign Application Priority Data

Jul. 1, 2002   (JP) .............................. 2002-191637

(51) Int. Cl.
*H04Q 7/20* (2006.01)
(52) U.S. Cl. ..................................... 455/513
(58) Field of Classification Search ................ 455/502, 455/456.1, 456.2, 513
See application file for complete search history.

(56) References Cited

U.S. PATENT DOCUMENTS

| | | | |
|---|---|---|---|
| 6,563,290 B2 * | 5/2003 | Sakakibara et al. | 320/106 |
| 6,665,541 B1 * | 12/2003 | Krasner et al. | 455/502 |
| 6,801,782 B2 * | 10/2004 | McCrady et al. | 455/517 |
| 2001/0053699 A1 * | 12/2001 | McCrady et al. | 455/513 |

FOREIGN PATENT DOCUMENTS

| | | |
|---|---|---|
| JP | 04-113294 | 4/1992 |
| JP | 04-351987 | 12/1992 |
| JP | 10-042343 | 2/1998 |
| JP | 10-505723 | 6/1998 |
| JP | 11-252631 | 9/1999 |

OTHER PUBLICATIONS

Patent Abstracts of Japan, JP 01-235884, Sep. 20, 1989.

* cited by examiner

*Primary Examiner*—Creighton Smith
(74) *Attorney, Agent, or Firm*—Oblon, Spivak, McClelland, Maier & Neustadt, P.C.

(57) ABSTRACT

A wireless communication system of a simple configuration enabled to perform both data communication and accurate ranging. In the system, a second wireless unit receives a ranging signal after a lapse of a propagation time since a first wireless unit transmits the ranging signal. Then, after a delay of an image elimination period, the second wireless unit transmits a response signal. The first wireless unit receives the response signal after a lapse of a propagation time. Then, the first wireless unit obtains the propagation time, during which the signal propagates between the first and second wireless unit, according to an elapsed time since the ranging signal is transmitted. The distance therebetween is obtained by dividing the obtained propagation time by the velocity of light. Before the image elimination period elapses, in order to eliminate the physical reflection of radio waves, the first wireless unit is inhibited from opening a reception gate.

12 Claims, 14 Drawing Sheets

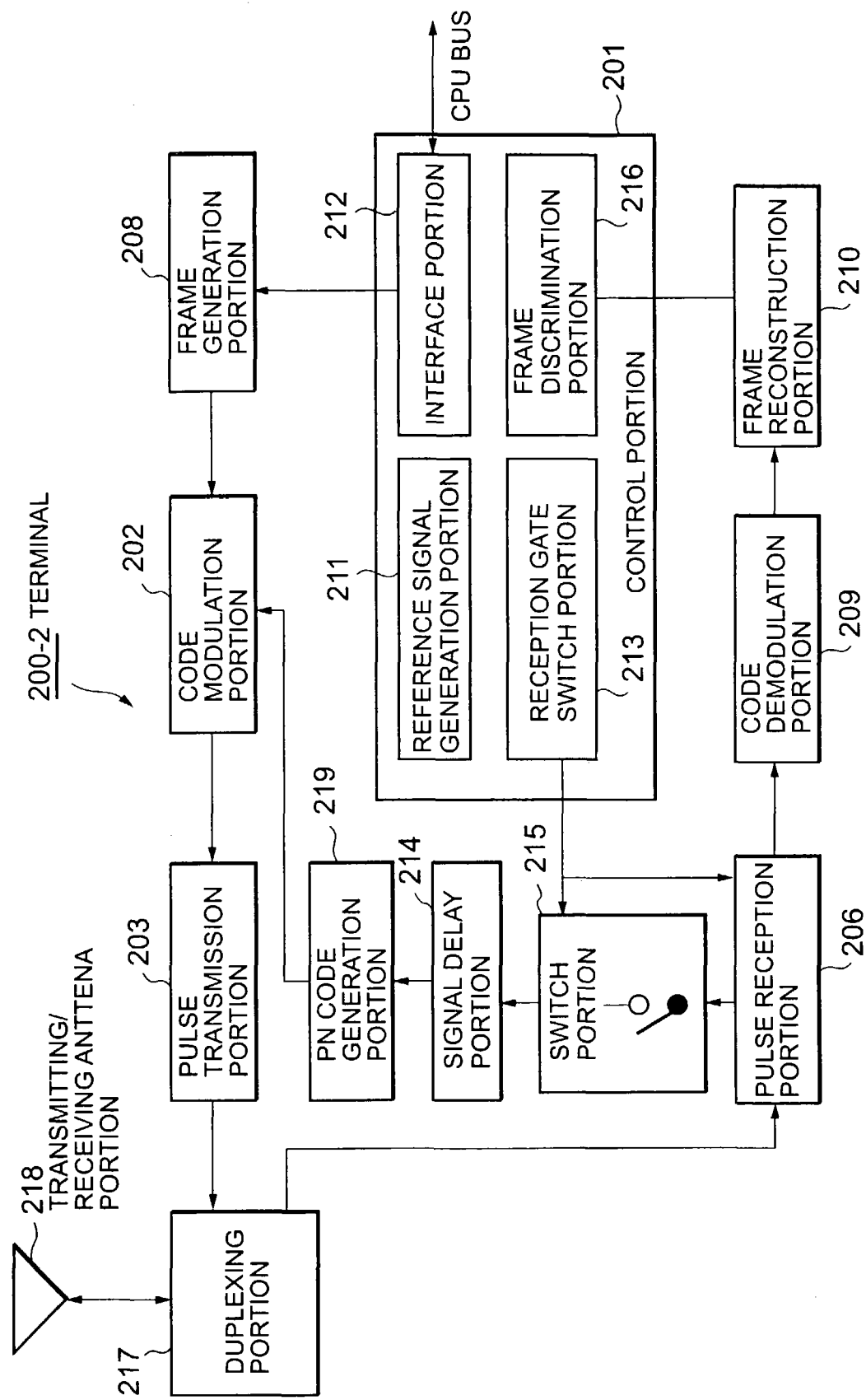

WIRELESS COMMUNICATION SYSTEM, WIRELESS COMMUNICATION DEVICE AND WIRELESS COMMUNICATION METHOD, AND COMPUTER PROGRAM

CROSS REFERENCES TO RELATED APPLICATIONS

The present document is based on Japanese Priority Document JP 2002-191637, filed in the Japanese Patent Office on Jul. 1, 2002, the entire contents of which being incorporated herein by reference.

BACKGROUND OF THE INVENTION

1. Field of the Invention

The present invention relates to a wireless communication system, a wireless communication device, a wireless communication method, and a computer program, which are used for enabling intercommunication among a plurality of wireless stations.

More particularly, the present invention relates to a wireless communication system, a wireless communication device, a wireless communication method, and a computer program, which are used for measuring or specifying a geographical position of a wireless terminal in a wireless network. More specifically, the present invention relates to a wireless communication system, a wireless communication device, a wireless communication method, and a computer program, which are used for measuring or specifying a geographical position of a wireless terminal in a wireless network with a granularity that is finer than a cell size.

2. Description of Related Art

Configuring a LAN (Local Area Network) by connecting a plurality of computers enables sharing of information, such as files and data, and peripheral equipment, such as a printer, and also enables information exchange, such as transfer of e-mails or data contents.

Hitherto, a wired LAN connection using optical-fiber cables, coaxial cables, or twisted-pair cables has commonly been employed. In this case, line-laying is needed, so that it is difficult to easily build a network, and that cable drawing is troublesome. The wired-LAN connection is inconvenient because the moving range of equipment is limited by cable length even after the LAN is built. Accordingly, a wireless LAN attracts attention as a system for freeing users from the wiring of a related art wired LAN. This wireless LAN saves most of wiring cables in a working space of an office. Consequently, communication terminals, such as personal computers (PCs), can relatively easily be moved therein.

In recent years, with increase in operating speed and reduction in cost of a wireless LAN system, demands therefor have extremely increased. Recently, the introduction of a personal area network (PAN) is studied so as to build a small wireless network built among a plurality of electronics provided in a person's immediate environment.

Different wireless communication systems have been prescribed by utilizing frequency bands, such as the 2.4-GHz band or the 5-GHz band, the frequencies of which are available without permissions from competent authorities. An IEEE 802.11 wireless network system utilizes radio waves at frequencies of the 2.4-GHz band or the 5-GHz band and enables spatial information transmission at a speed ranging from several Mbps to several tens Mbps. In many wireless networks, wireless transmitting/receiving devices, which are enabled to perform effective communication within a "cell" coverage under a control of a wireless base station, operate and perform intercommunication among them. Generally, each cell has a diameter ranging from several tens meters to several hundreds meters.

Usually, one service area is provided with a plurality of wireless base stations. A wired network intercommunicates among these base stations. Each of the wireless base stations notifies wireless terminals, which are present in a cell, of the presence of a cell coverage area thereof by periodically broadcasting a radio frame, which is called a beacon frame (incidentally, a beacon frame is represented by an identification signal), to the wireless terminals. Thus, a wireless network is built. Additionally, this beacon frame may include information for performing a communication control operation, such as an operation of assigning a time slot to a specific terminal.

FIG. 1 illustrates a multiple access method using CSMA/CA (Carrier Sense Multiple Access/Collision Avoidance) technique, which is employed in an IEEE 802.11 system.

This figure illustrates a case that a base station communicates with two terminals A and B. An example illustrated in this figure is adapted so that the base station performs unicast communication with each of the terminals, and that when a data frame is accurately received by a receiving portion, the receiving portion informs a transmitting portion of success of the communication by returning an ACK frame thereto.

FIG. 2 illustrates a format of a data frame according to the IEEE 802.11 standard. FIG. 3 shows a format of the ACK frame. In the format of each of these frames, a MAC (Machine Access Control) header has a Duration/ID field for which a value updating a time required until the completion of a sequence of communication operations is substituted. When a terminal, which currently transmits no data, receives this field, this terminal is enabled to predict a time when this terminal becomes able to transmit data.

According to a CSMA/CA method, radio waves are asynchronously transmitted from the base station and the terminals. Thus, to avoid a collision of frames and to realize priorities of transmissions of data frames according to the kinds of the data frames, a contention period, a backoff period, and periods each called an IFS (Inter-Frame Space) interval, during which the transmissions are inhibited, are set between the data frames. Incidentally, in FIG. 1, "DIFS" is an abbreviation of "DCF IFS" (additionally, "DCF" is an abbreviation of "Distributed Coordination Function" described in the IEEE 802.11 specification), and "SIFS" is an abbreviation of "Short IFS" also described therein. The values of the SIFS interval and the DIFS interval are 16 microseconds and 34 microseconds as practical values of the IFS interval according to the IEEE 802.11 standards, respectively.

FIG. 4 illustrates a multiple access method using a TDMA/TDD (Time Division Multiple Access/Time Division Duplex) technique. According to this method, transmission and reception operations in the base station and all the terminals accessing thereto under the control of the base station, are performed in synchronization with one another. In an example illustrated in this figure, a frame period of a frame repeated in a predetermined cycle is divided into a plurality of slot periods that are assigned to periods during which the transmission and reception operations are performed by the base station and the terminals. Because the duration of each of the slot periods is constant, a time period unused for data communication may occur in a case that a time required to transmit data is shorter than the slot period. Additionally, transmission inhibition periods for preventing occurrences of collisions of transmission slots due to the difference in distance between the base station and each of the terminals and in transmission timing therebetween, that is, guard periods are set in the frame period.

Meanwhile, in a wireless network, each of wireless terminals usually can geographically move. To enable a wireless terminal to continuously make communication even when the wireless terminal goes out of a cell covered by a certain base station, it is necessary to perform an operation of successively changing a base station, to which the wireless terminal is connected, with the movement of the wireless terminal. Generally, such an operation of changing the base station is called a "handover".

To perform a handover, it is necessary that a wireless terminal knows the presence of a base station by receiving a beacon frame transmitted from the base station. The wireless terminal selects a base station, which can provide better communication thereto, by utilizing the electric field strength (indicated by RSSI (Received Signal Strength Intensity) signals) of the beacon or utilizing, during the wireless terminal is connected to a base station, the RSSI of a data communication frame so as to be connected to the base station and as to make judgment on the base station. In such a system, during the terminal is connected to the base station, the position of the terminal can be known with the granularity that is equal to the size of the cell covered by the base station.

The terminal connected to the base station can exchange information with various servers through a wired network connecting between the base stations. In this case, a user can enjoy services provided by the data communication.

Related art wireless network techniques do not provide a mechanism for measuring the geographical position of a terminal. Because only rough conjecture thereof employing the size of the cell, which is covered by the base station, as the granularity can be performed, in a case that the coverage area thereof is large, and that a plurality of cells overlap with one another, a problem may occur. It is impossible to discriminate among a plurality of terminals connected to the same base station.

In a case that a problem occurs when the position of a terminal is specified with the granularity that is equal to the size of the wireless cell, it is considered to adopt a more accurate approach of combining ultrasonic-based or infrared-based techniques of measuring the position of a wireless terminal with a device for data communication. However, it is necessary to mount two systems, that is, a data communication system and a position measuring system in a wireless communication device. This results in increase in size and cost of the apparatus.

It is also considered to adopt another approach of measuring the position of a wireless terminal by causing a base station to first transmit a data frame and to measure the distance therefrom to the wireless terminal according to a time from the transmission of the data frame to reception of an ACK frame from the wireless terminal. However, it is necessary for realizing the distance measuring accuracy of, for example, 1 meter to complete the generation and transmission of an ACK frame in a time of less than 10 nanoseconds. Consequently, a complex and expensive system is needed.

Recently, a cellular telephone system combined with a GPS (Global Positioning System) so as to provide means for detecting a position of a terminal has emerged. This is a technology of a US company, QUALCOMM, Incorporated that is called gpsOne (incidentally, gpsOne is a trademark of QUALCOMM, Incorporated). According to this technology, a wireless terminal having received a positioning signal from a GPS satellite performs signal processing in cooperation with the base station. Usually, each cell coverage area in a cellular telephone network has a diameter of several hundreds meters to several kilometers. According to this system, the geographical position of the terminal can be identified with the accuracy of about several meters.

Although such a GPS can identify the position of a terminal with the precision of several meters, this function cannot be utilized with high precision in an environment that cannot get radio waves from the GPS satellite. Thus, a constraint is imposed to the indoor utilization of radio waves sent from a GPS satellite. A circuit for processing GPS signals is also needed. Consequently, the whole system is complicated.

For instance, the specification of Japanese Patent Application No. 3-113927 discloses a system for identifying a position of a transmitter. However, it is necessary to provide a time reference station in a measuring region. Additionally, this system has no functions for data communication.

Japanese Patent Laid-Open No. 5-60854 discloses a system for measuring a position of a transmitter. This system aims at realizing a measurement of the position without employing a reference transmitter and a complex circuit configuration. However, this system has encountered a problem in a case that a time delay between a reference station and a computer for computing the position affects the measuring accuracy.

According to the related art wireless LAN techniques, an accurate position of a terminal cannot be measured. The related art has drawbacks in that it is necessary for realizing the accurate measurement of the position of the terminal to achieve the synchronization among the wireless base stations and to realize the highly agreement of clock accuracy among them, that the scale of the circuit increases, and that the cost of managing the base station increases. Thus, the related art is not suitable for measuring the position of a terminal in a wireless LAN system in which many base stations are disposed.

SUMMARY OF THE INVENTION

The present invention is accomplished to provide a wireless communication system, a wireless communication device, and a wireless communication method, and a computer program, which are excellent and enabled to preferably measure or identify the geographical position of a wireless terminal in a wireless network, and to provide a wireless communication system, a wireless communication device, and a wireless communication method, and a computer program, which are excellent and enabled to preferably measure or identify the geographical position of a wireless terminal with a granularity that is finer than a cell size.

The present invention also provides a wireless communication system, a wireless communication device, and a wireless communication method, and a computer program which are excellent and enabled to perform data communication and accurate distance measurement with an easy circuit configuration.

Accordingly, according to an aspect of the present invention, there is provided a wireless communication system for performing information transmission with a predetermined transmission frame period. This system comprises a first wireless unit for transmitting a ranging signal, and a second wireless unit for receiving the ranging signal and for returning a response signal to the first wireless unit after a lapse of a predetermined period since the second wireless unit receives the ranging signal. In this system, the first wireless unit measures a distance between the first wireless unit and the second wireless unit according to a propagation time between the first wireless unit and the second wireless unit. The propagation time is obtained from an elapsed time since the first wireless unit transmits the ranging signal.

Incidentally, the "system" referred to herein is defined as a logical set of a plurality of units (or function modules each realizing specific functions) irrespective of whether or not the units exist in a single casing.

In a case of the wireless communication system according to an aspect of the present invention, a geographic position of a wireless unit, such as a wireless terminal, can preferably be measured or specified with a granularity that is finer than a cell size. Consequently, the system can provide various services to terminals, which exist in a cell, according to the positions thereof.

For instance, the system can accurately know the distance between a first wireless unit and a second wireless unit, such as a base station and a terminal, respectively, so that reduction in the power consumption of the first and second wireless units can be realized by controlling electric power transmission according to the distance therebetween during data communication.

The second wireless unit can preliminarily know another first wireless unit, which may be connected thereto next time, by deciding the movement speed thereof and the direction of the movement thereof.

The system can be adapted so that terminals to be connected to the same base station may be inhibited depending on the positions thereof from being connected thereto.

The ranging techniques according to the present invention can be achieved even in an existing wireless LAN system by adding a pulse processing portion or a function equivalent thereto to an existing wireless communication apparatus. The ranging techniques according to the present invention have a high affinity for the existing systems.

According to another aspect of the present invention, there is provided a wireless communication system for performing information transmission with a predetermined transmission frame period. This system comprises ranging-signal transmission means for transmitting a ranging signal to a specific wireless unit in the wireless network, response-signal reception means for receiving a response signal from the wireless unit after a lapse of a predetermined period since the ranging signal is transmitted, and distance measurement means for measuring a distance therefrom to the wireless unit according to a propagation time obtained from an elapsed time from a moment, at which the ranging signal is transmitted, to a moment at which the response signal is received.

According to another aspect of the present invention, there is provided a wireless communication method for performing information transmission with a predetermined transmission frame period. This method comprises the steps of transmitting a ranging signal to a specific wireless unit in the wireless network, receiving a response signal from the wireless unit after a lapse of a predetermined period since the ranging signal is transmitted, and measuring a distance to the wireless unit according to a propagation time obtained from an elapsed time from a moment, at which the ranging signal is transmitted, to a moment at which the response signal is received.

According to another aspect of the present invention, there is provided a wireless communication device for performing information transmission with a predetermined transmission frame period. This device comprises ranging signal reception means for receiving a ranging signal from a wireless unit of a wireless network, and response signal transmission means for transmitting a response signal after a lapse of a predetermined time since the ranging signal is received.

According to another aspect of the present invention, there is provided a wireless communication method for performing wireless communication in a wireless network. This method comprises the steps of receiving a ranging signal from a wireless unit of the wireless network, and transmitting a response signal after a lapse of a predetermined time since the ranging signal is received.

Incidentally, the transmission frame period of the wireless network may be provided with a data period and a ranging period. In the data period, transmission data is transmitted and received. During the ranging period, the distance between wireless units is measured. The latter ranging period may be used for performing transmission of a ranging signal between the wireless units and the transmission of a response signal corresponding thereto.

Even in a case of the apparatus and methods according to these aspects of the present invention, advantages similar to the above-mentioned advantages of the system and method according to the present invention can be obtained.

Incidentally, the second wireless unit transmitting the response signal, such as a terminal, may transmit the response signal after a lapse of an image elimination period, which is necessary for masking an image due to reflection of waves from an unintended object, and/or a ranging delay time including a delay time caused in a signal processing in the second wireless unit, in addition to a two-way propagation time of a pulse propagating between the first wireless unit and the second wireless unit at a propagation velocity.

Meanwhile, in the first wireless unit receiving the response signal, such as a base station, it is sufficient to enable a reception gate, which is used for receiving the response signal from the second wireless unit, after a lapse of an image elimination period, which is necessary for masking an image due to reflection of waves from an unintended object, and a ranging delay time including a delay time caused in a signal processing. Consequently, the ranging signal transmitted from the first wireless unit itself can be prevented from being received as a physically reflected wave. The reception gate is enabled until the two-way wave delay time in the range, in which ranging is performed, lapses.

Preferably, the first wireless unit may transmit a ranging signal consisting of a single pulse signal or a plurality of pulse signals.

Preferably, the second wireless unit may transmit a response signal consisting of a single pulse signal or a plurality of pulse signals.

An operation time of the reception gate provided at the side of the second wireless unit is designated in a region in the data frame. Thus, the pulse arrival timing can be predicted with high accuracy. A high processing gain can be realized. The precision of discrimination between a ranging signal and a noise can be enhanced. However, the operation time of the reception gate at the first wireless unit should have a period corresponding to the range in which ranging is performed by the second wireless unit. This period is longer as compared with the duration width of the response signal sent from the second wireless unit. Therefore, it is necessary to devise some means for obtaining a high processing gain.

Thus, the terminal may transmit a response signal consisting of a sequence of a plurality of PN-coded pulses. In this case, the first wireless unit can use a sequence of the same PN-coded pulses as used by the second wireless unit in synchronization with the transmission time of the ranging signal, and conducts measurement by performing correlation processing on these PN-coded pulses and those sent from the second wireless unit.

According to another aspect of the present invention, there is provided a computer program described in a computer-readable form in such a way as to execute an operation, which causes a wireless unit to perform information transmission with a predetermined transmission frame period, on a computer system. This computer program comprises the steps of transmitting a ranging signal to a specific wireless unit in the wireless network, receiving a response signal from the wireless unit after a lapse of a predetermined period since the ranging signal is transmitted, and measuring a distance to the wireless unit according to a propagation time obtained from an elapsed time from a moment, at which the ranging signal is transmitted, to a moment at which the response signal is received.

According to another aspect of the present invention, there is provided a computer program described in a computer-readable form in such a way as to execute an operation, which causes a wireless network to perform wireless communication, on a computer system. This computer program comprises the steps of receiving a ranging signal from a wireless unit in the wireless network, and transmitting a response signal after a lapse of a predetermined time since the ranging signal is received.

The computer programs according to these aspects of the present invention are defined as those described in the computer-readable form in such a way as to realize the execution of predetermined processing on a computer system. In other words, advantages similar to those of the wireless communication device and method of the present invention can be obtained by installing the computer programs onto the computer system to thereby perform cooperative operations thereon.

As described in detail above, the present invention can provide a wireless communication system, a wireless communication device, and a wireless communication method, and a computer program, which are excellent and enabled to preferably measure or identify the geographical position of a wireless terminal.

BRIEF DESCRIPTION OF THE DRAWINGS

Other objects, features and advantages of the present invention will become apparent from the following description of preferred embodiments with reference to the drawings in which like reference characters designate like or corresponding parts throughout several views, and in which:

FIG. 14 is a view schematically illustrating a configuration of a wireless terminal 200-2 according to the second embodiment of the present invention.

DETAILED DESCRIPTION OF THE PREFERRED EMBODIMENTS

Hereinafter, preferred embodiments of the present invention will be described in detail by referring to the accompanying drawings.

Figure 5:
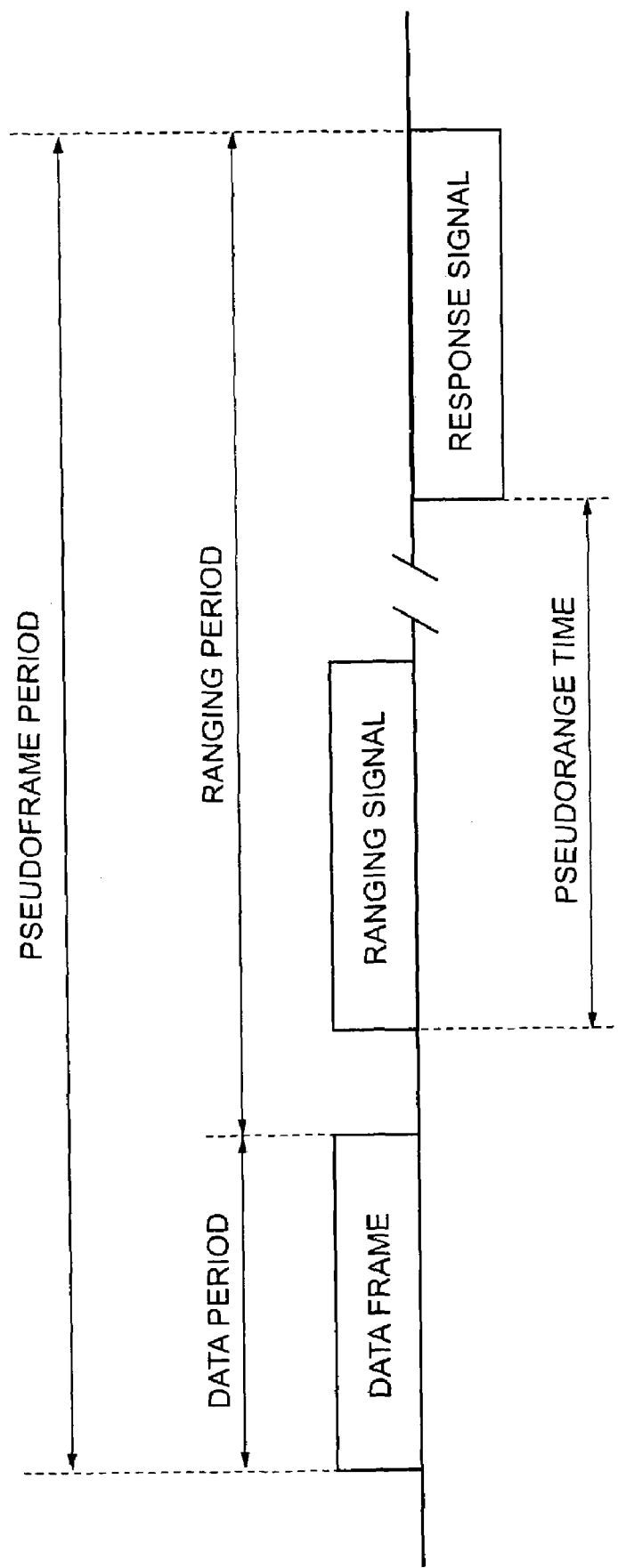
FIG. 5 is a view schematically illustrating a format of a data frame used in a wireless network according to an embodiment of the present invention.

FIG. 5 schematically shows a format of a data frame used in a wireless network according to this embodiment. As shown in the figure, a frame in a wireless segment consists of parts respectively corresponding to a "data period" and a "ranging period". Both these periods are merged into a period that is referred to as a "pseudoframe period" herein.

Figure 1:
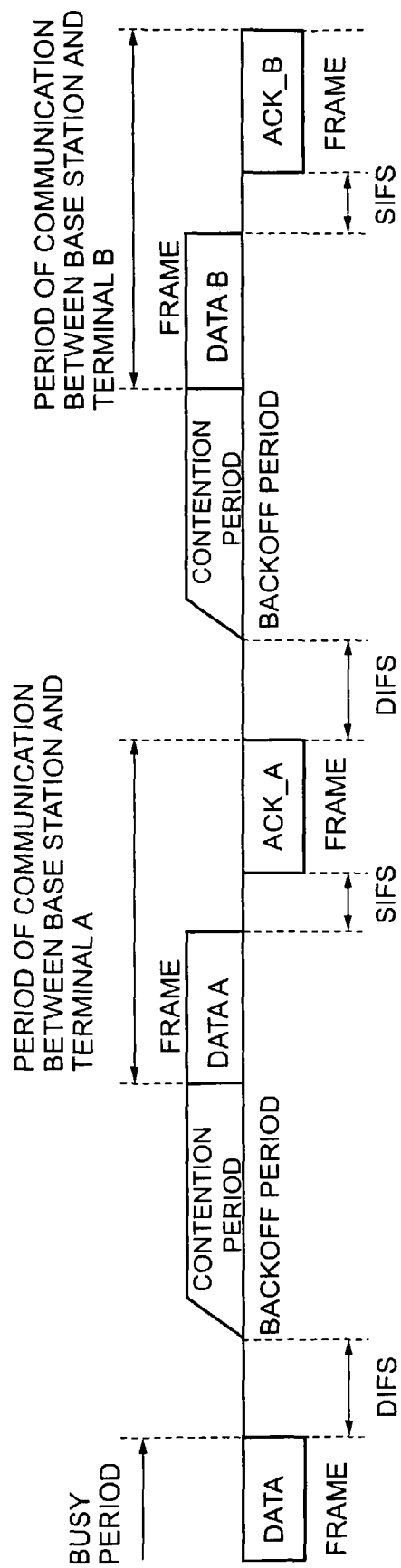
FIG. 1 is a view illustrating a multiple access method using CSMA/CA (Carrier Sense Multiple Access/Collision Avoidance) technique in a wireless segment, which is employed in an IEEE 802.11 system.
Figure 2:
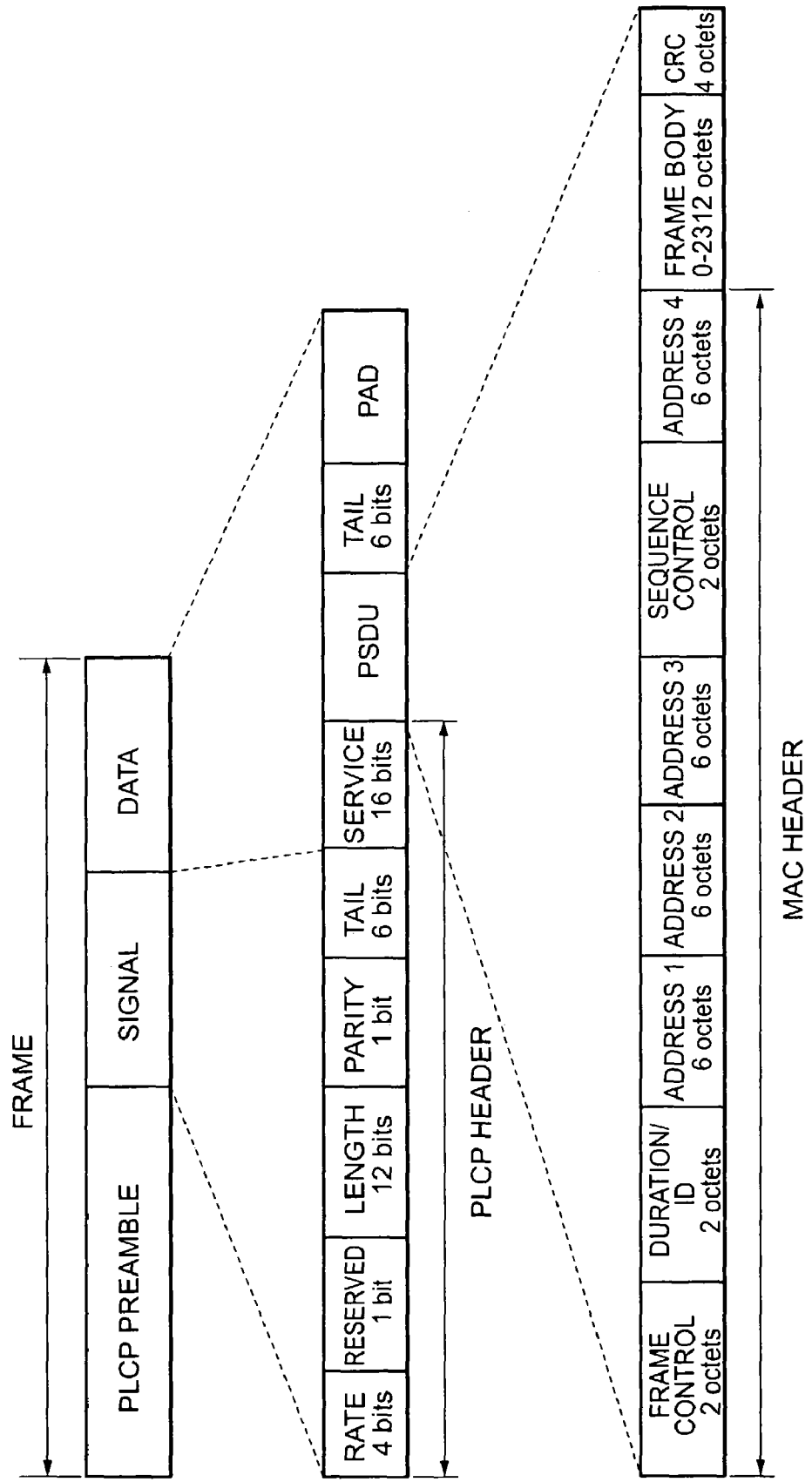
FIG. 2 is a view illustrating a format of a data frame according to the IEEE 802.11 standard.
Figure 3:
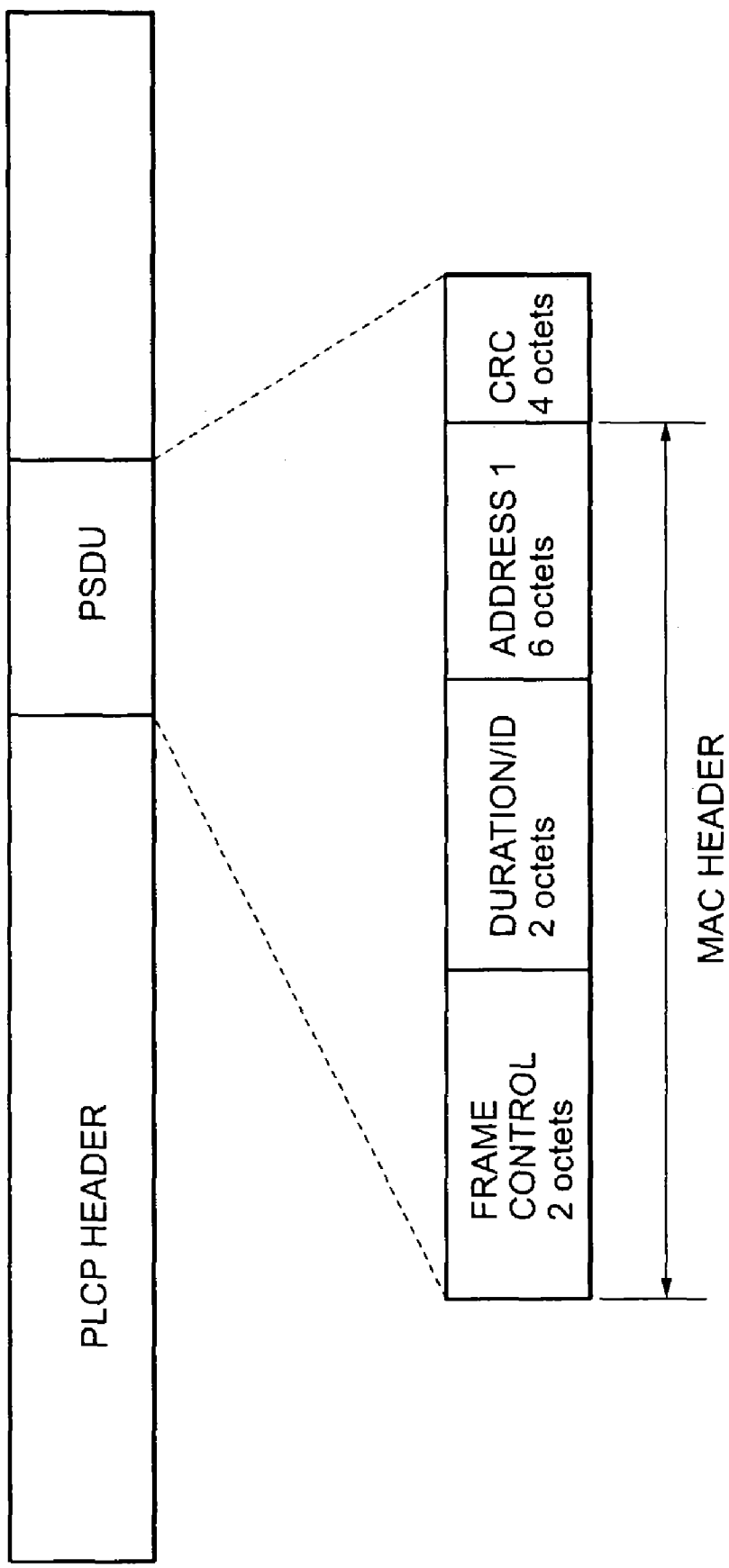
FIG. 3 is a view illustrating a format of an ACK frame.
Figure 4:
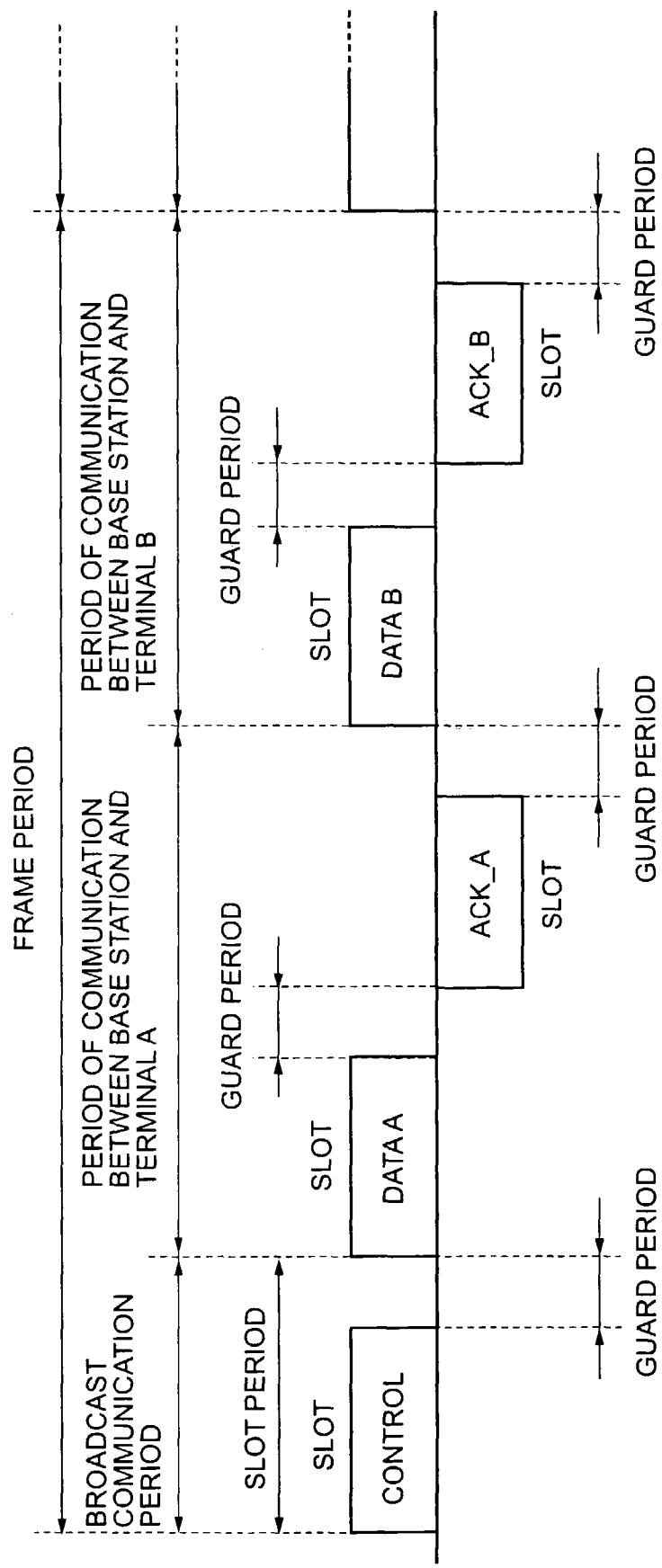
FIG. 4 is a view illustrating a multiple access method using a TDMA/TDD (Time Division Multiple Access/Time Division Duplex) technique.

A data frame, which is present in the data period, corresponds to a frame shown in FIG. 2 and to a slot shown in FIG. 4. Digital information is exchanged between a first wireless unit and a second wireless unit. Incidentally, for convenience of description, an embodiment to be described hereinbelow is an example of an application of the present invention to a network having a hierarchical structure that includes a "base station" and a "terminal". In the present embodiment, the base station corresponds to the first wireless unit and the terminal corresponds to the second wireless unit. Needless to say, the present invention can be applied to a wireless ad hoc network having no base stations.

A ranging signal, which is present in the ranging period, consists of a single pulse signal transmitted from the base station (that is, the first wireless unit transmitting the ranging signal) or a plurality of pulse signals transmitted therefrom. A pulse width can be shorten or lengthen according to the desired accuracy of measurement of the distance, similarly as done in a field of existing radar technology. For example, currently, a pulse width of 1 nanosecond (ns) or less can be realized by utilizing UWB (Ultra Wide Band) wireless technology (incidentally, a UWB system uses extremely fine pulses thereby to have high time resolution and to enable high-accuracy ranging by utilizing high-definition radar and precision-positioning-capabilities).

The terminal (that is, the second wireless unit receiving the ranging signal) having received the ranging signal transmits a response signal, which is present in the ranging period, in response to the ranging signal. This response signal consists of a single pulse signal or a plurality of pulse signals in correspondence with the ranging signal sent from the base station.

In the present specification, a time from the transmission of a ranging signal from a base station to the reception of a response signal by the base station is referred to as a "pseudorange time". This "pseudorange time" includes an "image elimination period", which is necessary for masking an image due to the reflection of waves from an unintended object, and also includes a delay time caused in a pulse processing circuit in the terminal, in addition to a two-way propagation time of a pulse propagating between a base station and a terminal at a propagation velocity. The distance between the base station and the terminal is determined from this pseudorange time.

Figure 6:
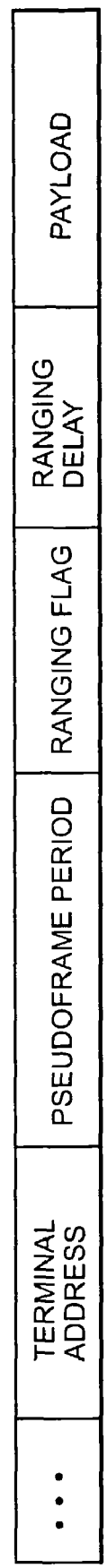
FIG. 6 is a view schematically illustrating a format of a data frame used in a wireless network according to an embodiment of the present invention.

FIG. 6 schematically illustrates a configuration of a data frame used in the wireless network according to this embodiment. This data frame consists of several fields described hereinbelow.

A "terminal address" field designates address information of a terminal that is a destination of this frame. A "pseudoframe period" field denotes time information representing a time from a leading portion of the data frame to an end of the pseudoframe. A "ranging flag" field designates information indicating that the frame to which the flag is attached is followed by measurement of the distance. A "ranging delay" field designates time information representing a time from the leading portion of the data frame to the initiation of transmission of a ranging signal. In a "payload" field, proper information representing a service needed by the terminal is stored.

Incidentally, the frame may be configured so that a value represented by the ranging delay field can be substituted for the ranging flag. For example, the system may be adapted so that when the value of the ranging delay field is 0, the ranging flag is off, and that when the value of the ranging delay field is not 0, the ranging flag is on and this is equivalent to the designation of the value of the ranging delay. In addition to the above-mentioned field, other information fields (see FIG. 2), which are present in the frame according to the IEEE 802.11 standard, may be present as fields that are precedent or subsequent to the data frame shown in the figure.

Figure 7:
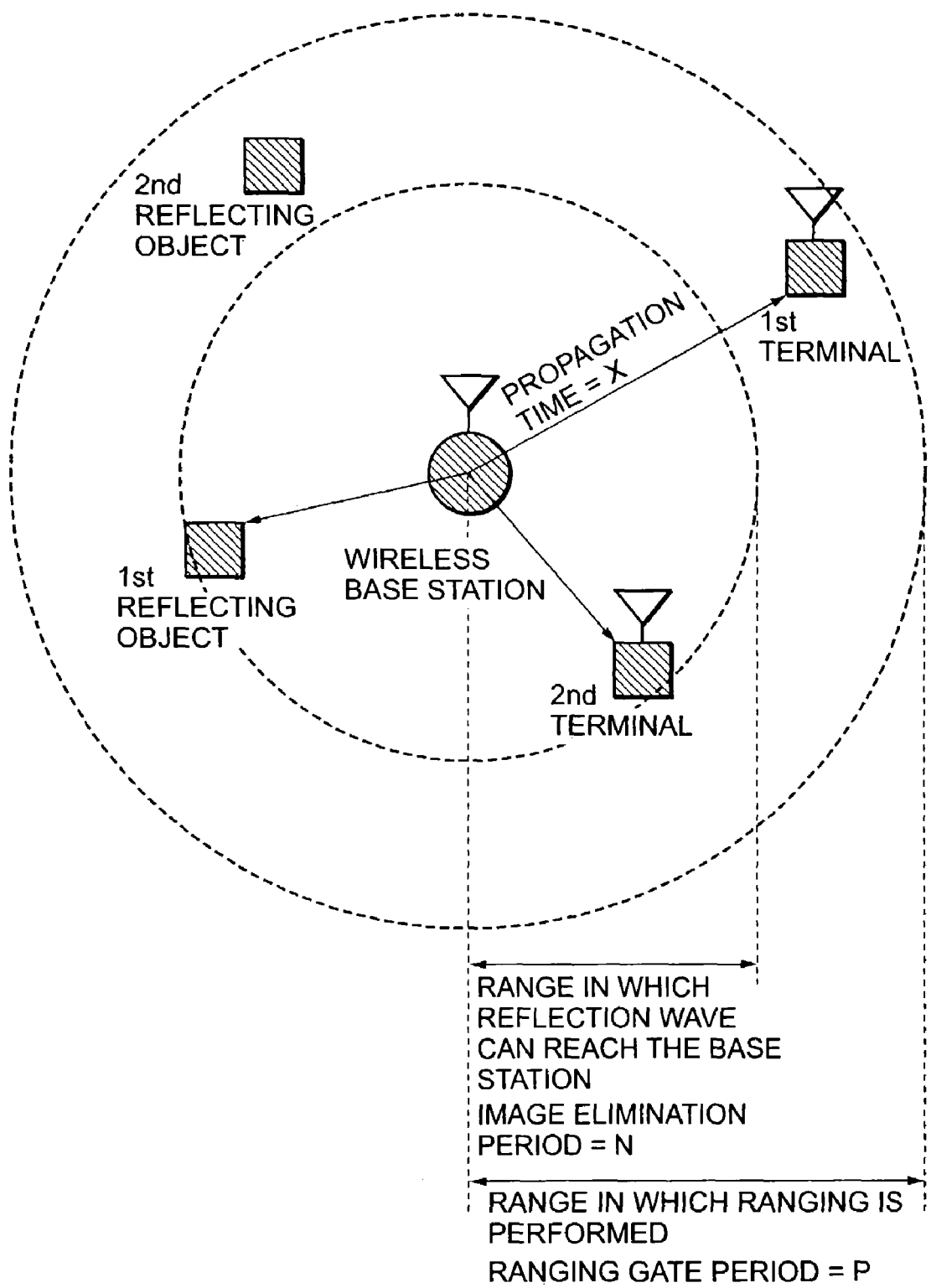
FIG. 7 is a view illustrating various ranges used when a base station (that is, a ranging-signal transmitting wireless unit) measures a distance therefrom to each of other wireless units.

FIG. 7 shows various ranges used when a base station measures the distance therefrom to each of other terminals. In this case, there are one wireless base station, two wireless terminals, and two objects. These objects can physically reflect ranging-signal radio waves sent from the base station.

A range, in which the ranging-signal radio wave transmitted from the base station is physically reflected and in which the reflected wave can reach the base station, is defined as an "image reflection period" N. A value of the two-way propagation time of the wave propagating between the base station and the reflecting object is used as a value of this period N. This value is determined according to the transmitted power of the ranging signal and to physical conditions for reflecting the waves in the vicinity of the base station.

A range, in which the base station performs measurement of the distance, is defined as a ranging gate period P. This value P is determined according to the two-way propagation time from the base station to a maximum ranging distance and the delay time occurred in a pulse processing circuit in the terminal.

A one-way wave propagation time of the wave propagating from the base station to the terminal is defined as a propagation time X. A value obtained by multiplying this value X by the velocity of light is calculated as an absolute distance between the base station and the terminal.

Figure 8:
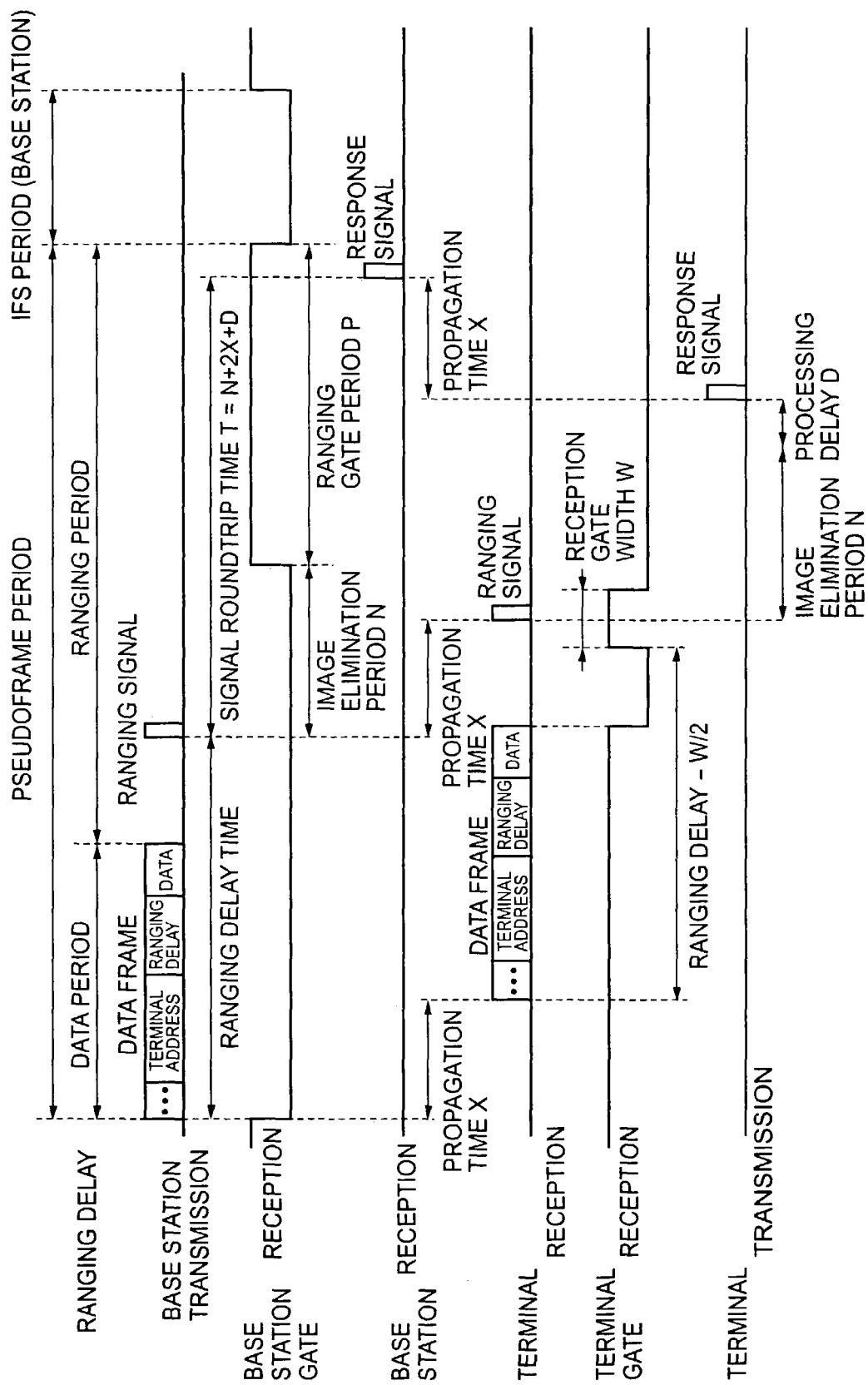
FIG. 8 is a view illustrating an entire sequence of measuring the distance between the base station (that is, the ranging-signal transmitting wireless unit) and each of the other wireless units.

FIG. 8 illustrates an entire sequence of measuring the distance between the base station and each of the other terminals in this embodiment.

The measurement of the distance between the base station and the terminal may be started by a request from a base-station selection device of the terminal or from an application program executed in the terminal in a case that the measurement of the distance therebetween is periodically performed by the base station. When the request arrives at the base station, the base station transmits a data frame, in which the ranging flag is on, to a terminal address of a terminal whose distance from the base station is to be measured. Then, the base station transmits a ranging signal when a time designated by the ranging delay field elapses from the start of the transmission of the data frame.

The terminal receives the data frame from the base station. Then, the terminal makes a judgment on a destination address. Thus, the terminal decides whether or not the data frame is sent to itself. If not, a time taken until the completion of this pseudoframe can be determined by referring to the value designated by the frame period field. Conversely, if so, the terminal refers to the ranging delay field and determines a time when the ranging signal arrives on the basis of the leading portion of the data frame received.

The terminal has a reception-inhibiting device in a wireless reception circuit so as to prevent the reception of signals other than a ranging signal during the ranging. This device is called a pulse reception gate. The terminal does not receive a signal in a period other than a time during this gate is enabled. Especially, in a case of utilizing UWB wireless technology, this device is important for enhancing capability to distinguish an object signal from an interference signal. A gate width W needed for receiving this ranging signal is determined by a width of a pulse signal to be transmitted. An ideal value of the gate width is equal to a width of a pulse to be transmitted. However, usually, because of the influence of the performance and margin of the reception circuit, a value, which is larger than the ideal value, is set to be the gate width W. When the terminal receives the last portion of the data frame, the gate is disabled. After a lapse of a time of (the ranging delay−W/2) since the reception of the leading portion of the data frame, the terminal enables the reception gate again. Subsequently, after a lapse of a time, which is equal to the gate width W, the terminal performs an operation of disabling this gate.

The terminal receives a ranging signal transmitted from the base station after the lapse of the propagation time X. Then, the terminal transmits a response signal after delayed by a time, whose length is equal that of the image elimination period N, since the reception of this ranging signal. An actual delay time is obtained by adding a time D, which is needed for the passage of the signal through the circuit, to the period N. This time D is allowed to always have a length of 0, or have a constant length during the ranging. However, the time D is permitted to vary within the ranging accuracy.

The base station receives a response signal transmitted by the terminal after the lapse of the propagation time X. Incidentally, although the base station has a reception gate device, a time period during which the gate is enabled, and a method of determining the width of this time period respectively differ from the corresponding time period and method employed in the terminal.

The base station does not enable the reception gate until the two-way wave propagation time elapses in the range in which a reflection wave can reach there, that is, until the image elimination period N elapses. Consequently, the base station can prevent the reception of the ranging signal, which is transmitted therefrom itself, as a physically reflected wave signal. The reception gate is enabled until the two-way delay time in the range, in which ranging is performed, as shown in FIG. 7 elapses.

When the response signal is received during the reception gate is enabled, the base station determines a time, which is elapsed since the transmission of the ranging signal therefrom, as a signal roundtrip time T by the following expression (1):

$$T = N + 2X + D \tag{1}$$

Thus, the distance from the base station to the terminal is obtained by the following expression (2):

$$(T - N - D)/2 \times C \tag{2}$$

where C designates the velocity of light.

Practically, a processing delay D of the terminal is included in the signal roundtrip time. Thus, when the value of the processing delay D cannot be determined, the distance is determined to be longer by D×C. When the absolute value of the delay D is determined, an absolute distance between the base station and the terminal is determined. In the case that the value of the delay D is not determined, the distance therebetween is determined as a pseudorange.

Figure 9:
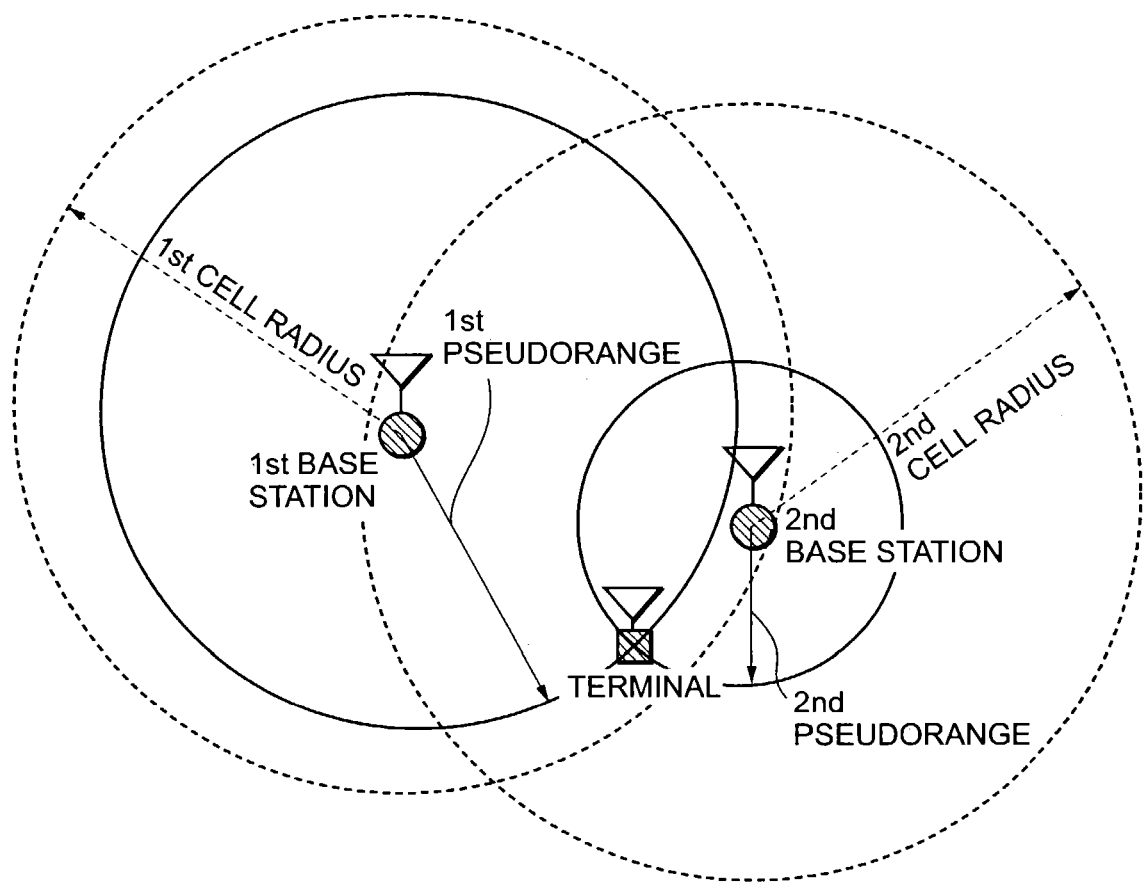
FIG. 9 is a view illustrating a manner in which the interconnection relation between a terminal and each of a plurality of base stations is communicated and the processing to be performed by executing an application program is switched according to the relative distance between the terminal and each of the plurality of base stations.

A plurality of pseudoranges each between the terminal and a corresponding one of a plurality of base stations can be obtained by iteratively performing the measurement of the distance between the terminal and a corresponding one of a plurality of base stations. In this case, when the value of the processing delay D included in the pseudorange is constant during the ranging period, or varies within a range in which the requested accuracy is not affected, the order of the relative distances each between the terminal and a corresponding one of the base stations can be determined. According to a result of this, the terminal or the base station can perform an operation of updating the interconnection relation therebetween and also can switch processing to be performed by executing an application program. FIG. 9 illustrates an example of this manner. In a case of the example illustrated in this figure, when a second pseudorange is shorter than a first pseudorange, the terminal is connected to a second base station.

Figure 10:
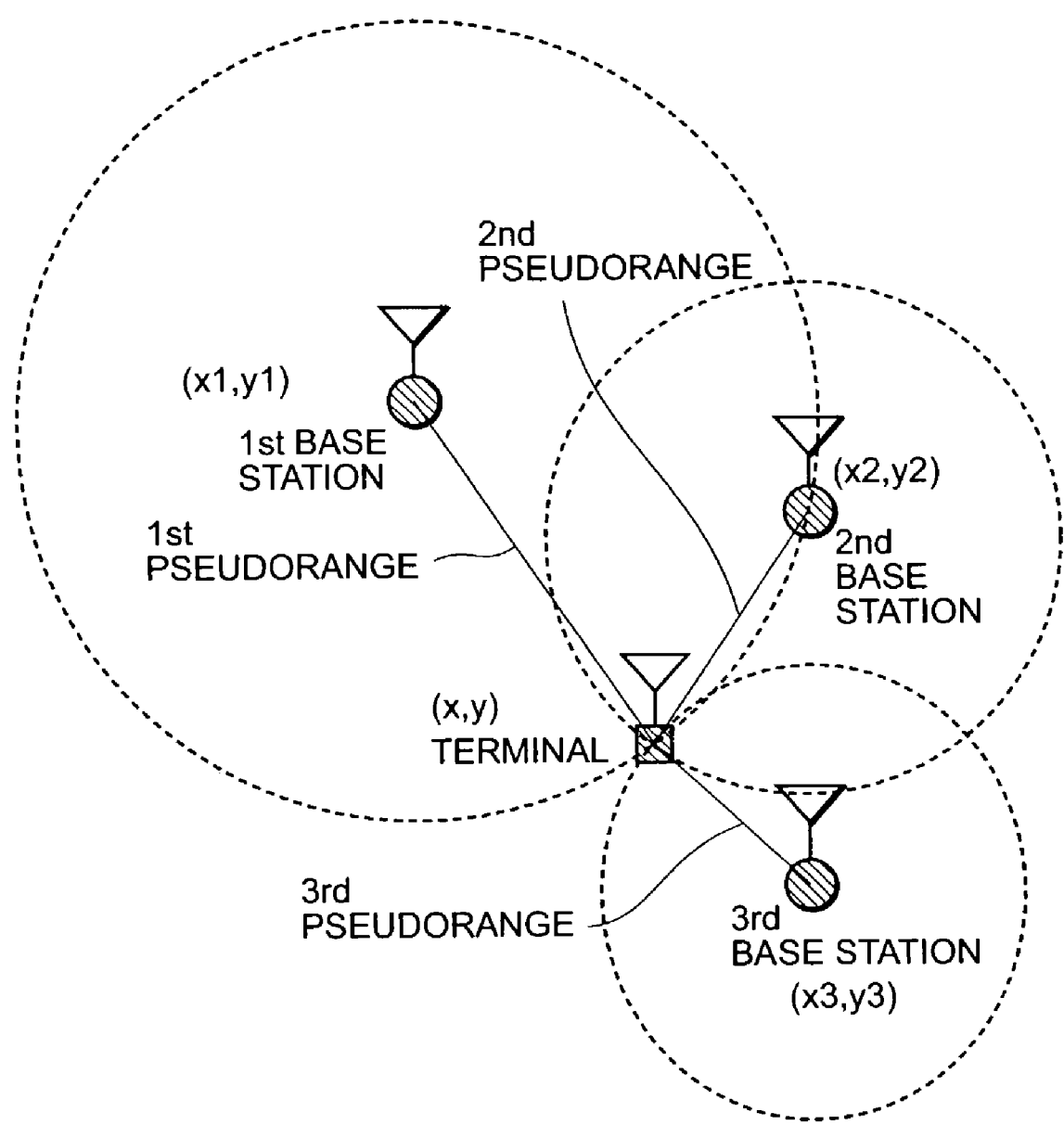
FIG. 10 is a view illustrating a manner in which the two-dimensional position of a terminal is determined by measuring the pseudoranges thereof from three or more base stations in a case that the two-dimensional coordinates of each of the base stations are known.

In a case of another example of application of the present invention, in a case that the two-dimensional coordinates of each of the base stations are known, the two-dimensional position of the terminal can be determined by measuring the pseudoranges of the terminal to three or more of the base stations. In FIG. 10, let (x1, y1), (x2, y2), and (x3, y3) denote the coordinates of three base stations, that is, a first base station to a third base station, respectively. Further, let r1, r2, and r3 designate the pseudoranges of the terminal to the first base station to the third base station, respectively. Then, the following simultaneous equations (3) are solved for x and y.

$$(x-x1)^2 + (y-y1)^2 = (r1 - D \times C)^2$$

$$(x-x2)^2 + (y-y2)^2 = (r2 - D \times C)^2$$

$$(x-x3)^2 + (y-y3)^2 = (r3 - D \times C)^2 \tag{3}$$

Each of results is obtained as the coordinates of the terminal.

Those skilled in the art would readily understand that the three-dimensional coordinates of the terminal could similarly be determined by measuring the relative distances of the terminal from four or more base stations whose three-dimensional coordinates are known.

Figure 11:
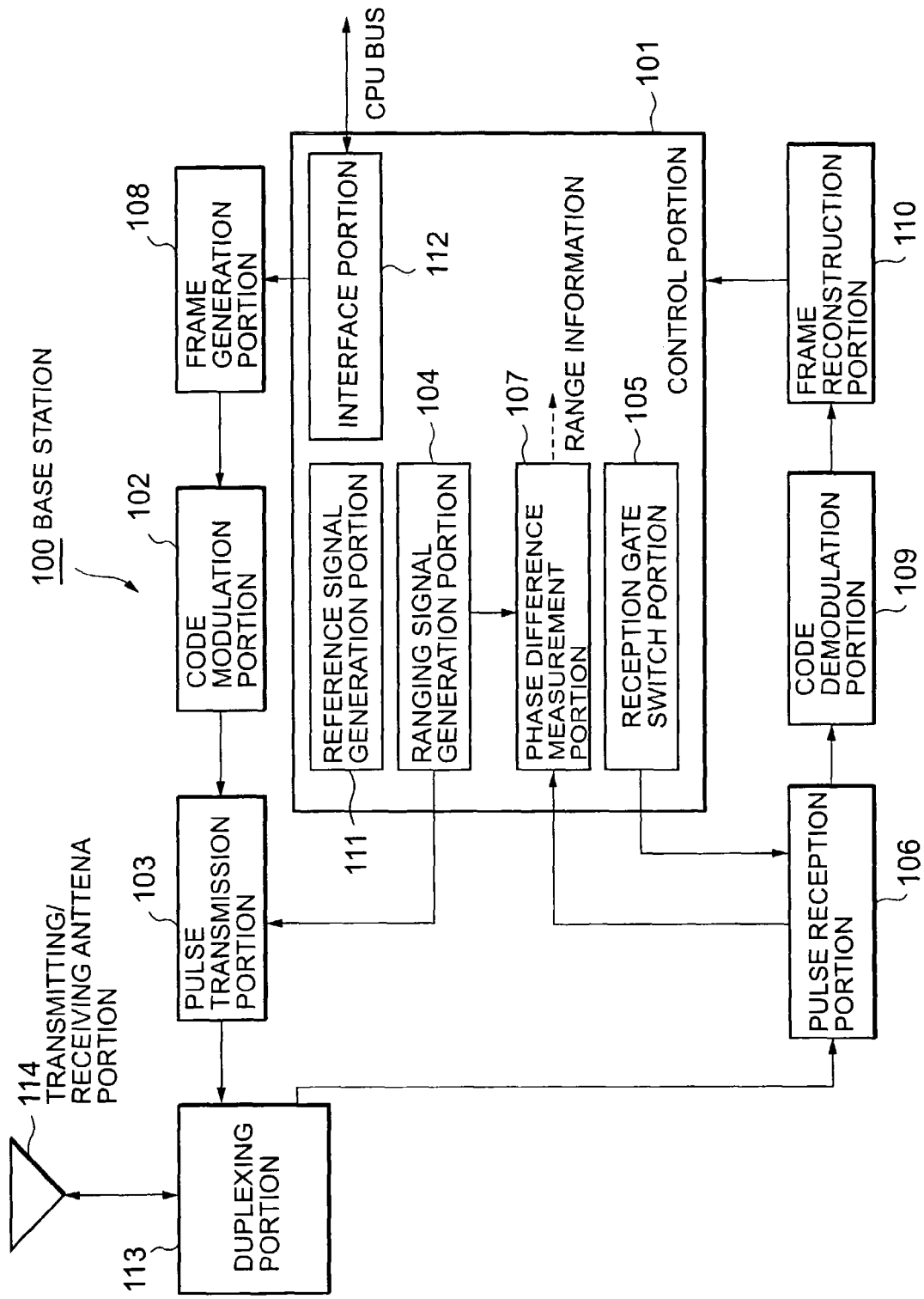
FIG. 11 is a view schematically illustrating a configuration of a wireless base station (that is, a ranging-signal transmitting terminal) 100 according to a first embodiment of the present invention.
Figure 12:
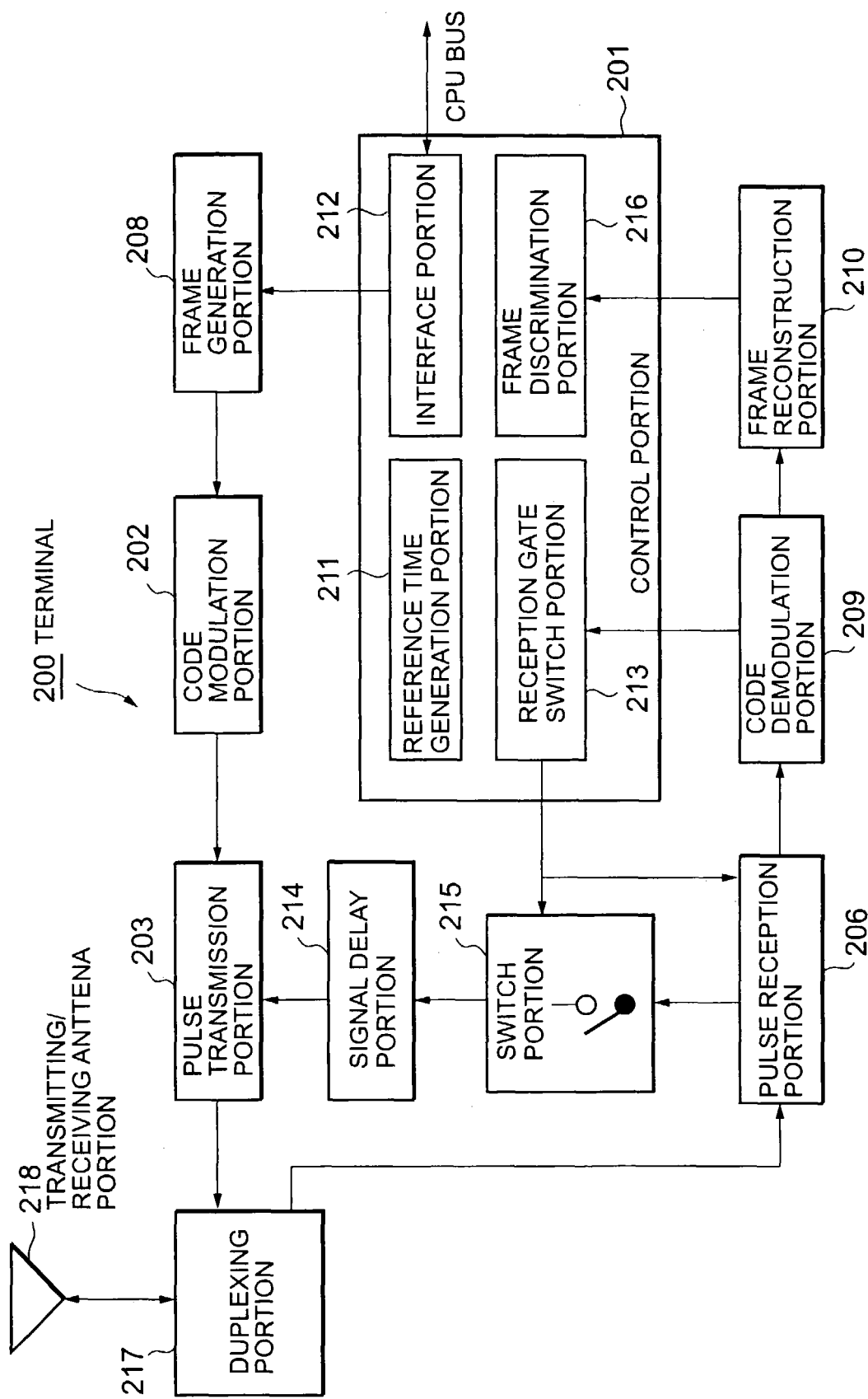
FIG. 12 is a view schematically illustrating a configuration of a wireless terminal (that is, a ranging-signal receiving terminal) 200 according to the first embodiment of the present invention.

FIGS. 11 and 12 schematically illustrate a wireless base station 100 and a wireless terminal 200 of the first embodiment of the present invention, respectively. Incidentally, a UWB wireless communication method may be employed (incidentally, a UWB system uses extremely fine pulses thereby to have high time resolution and to enable high-accuracy "ranging" by utilizing high-definition radar and precision-positioning-capabilities).

Among the constituent elements of the wireless base station 100 illustrated in FIG. 11, each of function modules, that is, a frame generation portion 108, a code modulation portion 102, a code demodulation portion 109, and a frame reconstruction portion 110 deals with a data frame. A reference signal generation portion 111 generates a reference signal for determining various control timings.

A ranging operation is performed in the wireless base station 100 in accordance with the procedure described therein.

(1) A control portion 101 of the base station 100 determines an address, a pseudoframe period, and a ranging delay of a terminal whose distance to the base station is to be measured. The frame generating portion 108 generates a data frame in which the ranging flag is on, and then sends the generated data frame to the code modulation portion 102. A reception gate switch portion 105 disables the gate of a pulse reception portion 106.

(2) The code modulation portion 102 modulates a base band signal by a method, which can be realized by the UWB technology, such as a pulse-phase modulation method, a pulse-position modulation method, a pulse-number modulation method, or a PN-code modulation method. Then, the code modulation portion 102 sends the modulated signal to a pulse transmission portion 103.

(3) The pulse transmission portion 103 generates an impulse at each request from the code modulation portion 102, and then radiates the impulse to a space through an antenna 114.

(4) A ranging signal generation portion 104 instructs the pulse transmission portion 103 to generate an impulse, after a lapse of the ranging time, which is determined by the control portion 100, since the reception of the leading portion of the data frame generated by the code modulation portion 102. The impulse is radiated to a space through the antenna 114. Simultaneously, a signal is sent to a phase difference measurement portion 107.

(5) The reception gate switch portion 105 enables a reception gate after a lapse of the image elimination period N since the generation of the ranging signal. Further, the reception gate switch portion 105 becomes ready for the reception of the response signal transmitted by the terminal.

(6) The pulse reception portion 106 receives a pulse only when the reception gate is enabled. The pulse reception portion 106 receives the response signal from the terminal as a pulse signal, and then sends the received response signal to the phase difference measurement portion 107.

(7) The phase difference measurement portion 107 measures the phase difference between a signal sent from the ranging signal generation portion 104 and the signal sent from the pulse reception portion 106. FIG. 8 shows a signal round trip time T that represents this phase difference in terms of a time.

Among the constituent elements of the wireless terminal 200 illustrated in FIG. 12, each of function modules, that is, a frame generation portion 208, a code modulation portion 202, a code demodulation portion 209, and a frame reconstruction portion 210 deals with a data frame. A reference signal generation portion 211 generates a reference signal for determining various control timings.

A ranging operation is performed in the wireless terminal 200 in accordance with the procedure described therein.

(1) Before the reception, in the terminal 200, a reception gate switch portion 213 enables the gate in a pulse reception portion 206. Then, the pulse reception portion 206 receives a data frame. A frame discrimination portion 216 decides whether or not the frame is sent thereto itself, and whether or not the ranging flag is on.

(2) The reception gate switch portion 213 disables the reception gate simultaneously with the termination of the data frame. Then, after a lapse of a time having a start delay value designated by the field in the data frame, that is, a time whose length is equal to (the reception gate width/2) since the arrival of the leading portion of the data frame, the reception gate switch portion 213 enables the gate in the pulse reception portion 206. Consequently, the preparation for receiving the pulse from the base station is completed. Simultaneously, the reception gate switch portion 213 controls a switch portion 215 so that a signal sent from the pulse reception portion 216 is directed to a signal delay portion 214. Incidentally, the reception gate width W is determined by the pulse width of a transmitted pulse, an error time between the value of the start delay caused in the base station and a value of a time taken until the actual transmission of the pulse, or an error time caused at the detection of the termination of the data frame in the terminal 200.

(3) The pulse reception portion 206 receives the ranging signal as a pulse, and then sends the received signal to the signal delay portion 214.

(4) When receiving the signal, the signal delay portion 214 delays the signal by a time that is equal to the period N in which the reflection wave can reach the base station. Thereafter, the signal delay portion 214 sends the delayed signal to a pulse transmission portion 203.

The pulse transmission portion 203 generates an impulse in response to the signal sent from the signal delay portion 214. Then, the pulse transmission portion 203 radiates the generated impulse to the space as a response signal through the antenna.

An operation time of the reception gate provided at the side of the wireless terminal 200 is designated by the field in the data frame (see FIG. 6). Thus, the pulse arrival timing can be predicted with high accuracy. A high processing gain can be realized. The precision of discrimination between a ranging signal and a noise can be enhanced.

However, the operation time of the reception gate at the wireless base station 100 should have a period corresponding to the range in which ranging is performed by the terminal 200. This period is longer as compared with the duration width of the response signal sent from the terminal 200. Therefore, it is necessary to devise some means for obtaining a high processing gain.

Figure 13:
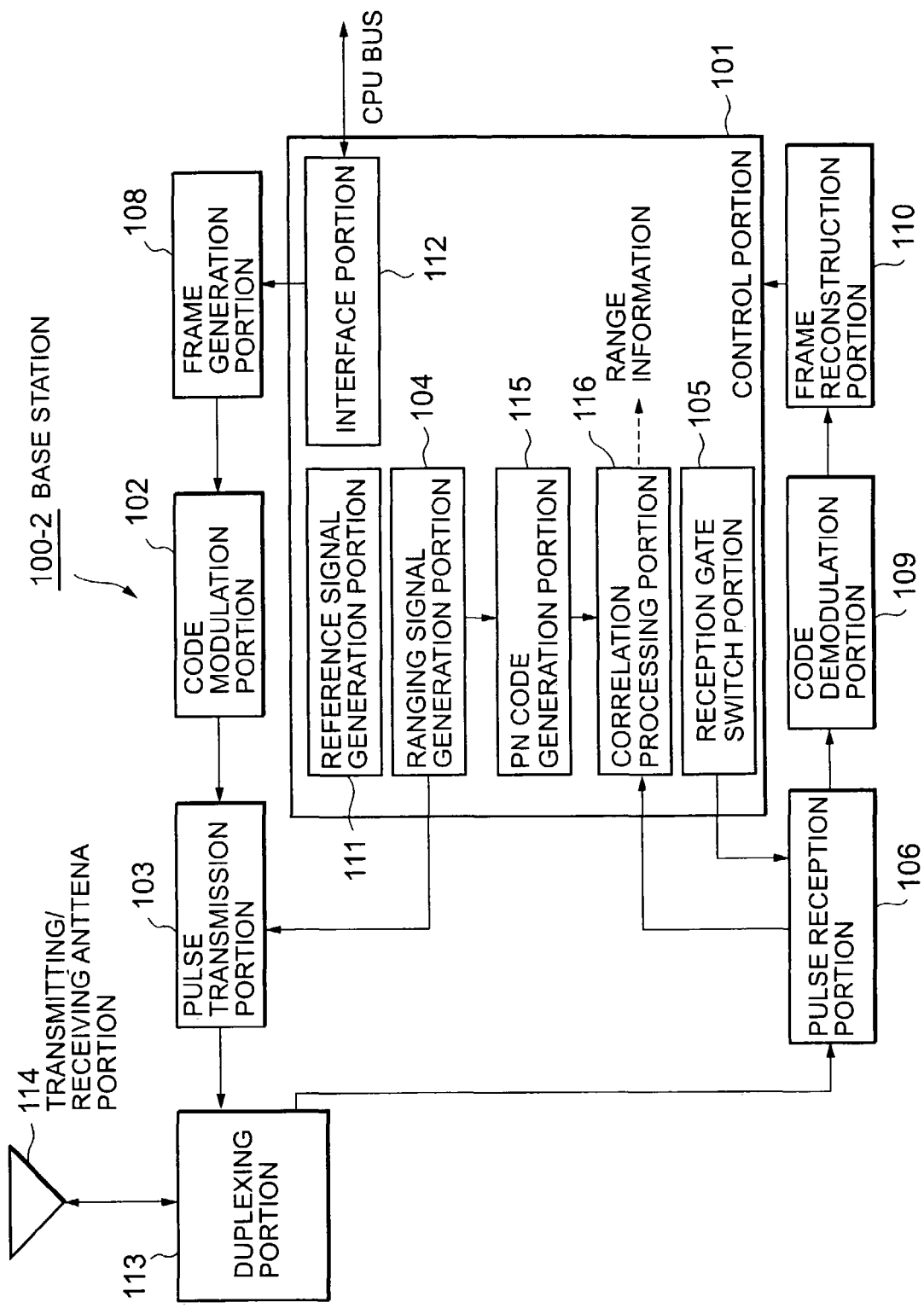
FIG. 13 is a view schematically illustrating a configuration of a wireless base station 100-2 according to a second embodiment of the present invention.

Thus, according to a wireless base station 100-2 and a wireless terminal 200-2 according to a second embodiment of the present invention, as illustrated in FIGS. 13 and 14, the terminal 200-2 returns a sequence of PN(Pseudonoise)-coded pulses to the base station 100-2 in response to the impulse sent therefrom. The base station 100-2 uses a sequence of the same PN-coded pulses as used by the terminal 200-2 in synchronization with the transmission time of the ranging signal, and conducts measurement by performing correlation processing on these PN-coded pulses and those sent from the terminal 200-2.

As shown in FIG. 14, in the terminal 200-2, a PN code generation portion 219 is added thereto as a subsequent stage of the signal delay portion 214. Low autocorrelation codes, such as an M-code, are utilized as the PN code.

The PN code generation portion 219 generates PN codes of one cycle simultaneously with the arrival of the signal from the signal delay portion 214 and then sends the generated PN codes to the code modulation portion 202. Incidentally, the PN code generation portion 219 may generate PN codes of several cycles for the correlation processing performed at the reception side. In this case, a period value is modulated using the PN code. Then, the delay time is determined by picking out the period value at which coincidence occurs during the correlation processing performed in the reception side.

As shown in FIG. 13, the base station 100-2 is equipped with the same PN code generation portion as provided in the terminal 200-2.

The ranging signal generation portion 104 notifies the PN code generation portion 115 of the generation of the ranging signal to be sent to the terminal 200-2. Then, the ranging signal generation portion 104 starts the generation of the PN code.

A correlation processing portion 116 detects a correlation value corresponding to the correlation between the signal sent form the PN code generation portion 115 and the signal sent from the code demodulation portion 109. Then, the signal roundtrip time T can be determined from a maximum correlation position.

Although the preferred embodiments of the present invention have been described in detail above, it should be understood that other modifications and alternatives will be apparent to those skilled in the art without departing from the sprint of the present invention, that the foregoing description of the embodiments of the present invention is illustrative, and that the present invention is not limited thereto. The scope of the invention, therefore, should be determined solely by the appended claims.

What is claimed is:

1. A wireless communication system including wireless units at least some of which are configured to perform data information transmission during a predetermined data communication period portion of a predetermined transmission frame period and to perform a distance measurement between particular wireless units during a ranging period portion of said predetermined transmission frame period separate from the data communication period portion, wherein, during the ranging period portion of said predetermined transmission frame period separate from the data communication period portion, a first wireless unit configured to perform data information transmission during the predetermined data communication period portion of the predetermined transmission frame period and to perform the distance measurement between particular wireless units during the ranging period portion of said predetermined transmission frame period separate from the data communication period portion is further configured to transmit a ranging signal to a second wireless unit, said second wireless unit is configured to receive the ranging signal and responds thereto by transmitting a response signal to said first wireless unit after a lapse of a predetermined delay period after said second wireless unit receives the ranging signal, and said first wireless unit includes a reception gate configure to prevent reception of signals for a predetermined masking time period during the ranging period portion having a predetermined duration necessary for masking reception of signals due to reflection of waves from an unintended object and to permit reception of the response signal from the second wireless unit after the predetermined masking time period elapses so as to then measure a distance between said first wireless unit and said second wireless unit according to an elapsed time measured from when said first wireless unit transmits the ranging signal until the first wireless unit receives the response signal from the second wireless unit after the predetermined masking time period elapses.

2. A wireless communication system including wireless units configured to perform data information transmission during a predetermined data communication period portion of a predetermined transmission frame period and to perform a distance measurement between particular wireless units during a ranging period portion of said predetermined transmission frame period separate from the data communication period portion, the wireless communication system comprising:

a local wireless unit including a ranging-signal transmission means for transmitting a ranging signal to a remotely located wireless unit in said wireless network during the ranging period portion of said predetermined transmission frame period separate from the data communication period portion of said predetermined transmission frame period;

means in the local wireless unit for blocking signal reception for a predetermined time duration determined to be sufficient to prevent reception of waves reflected from an unintended object and for permitting signal reception after the predetermined time duration has elapsed;

response-signal reception means in the local wireless unit for receiving a response signal from said remotely located wireless unit after the predetermined time duration has elapsed; and distance measurement means in the local wireless unit for measuring a distance from the local wireless unit to said remotely located wireless unit according to an elapsed time from a moment-when the ranging signal was transmitted to a moment when the response signal was received by the local wireless unit.

3. A wireless communication method performing a distance measurement between at least two wireless units in a wireless network in which the wireless units exchange data information during a predetermined data communication period portion of a predetermined transmission frame period, the wireless communication method comprising the steps of:

transmitting a ranging signal from a local wireless unit to a remotely located wireless unit in said wireless network during the ranging period portion of said predetermined transmission frame period separate from the data communication period portion;

receiving a response signal from said remotely located wireless unit indicating receipt of the ranging signal by the remotely located wireless unit during the ranging period portion of said predetermined transmission frame period separate from the data communication period portion; and measuring the distance from said local wireless unit to said remotely located wireless unit according to an elapsed time from a moment when the ranging signal is transmitted to a moment when the response signal is received by the local wireless unit, wherein said step of receiving the response signal from said remotely located wireless unit includes enabling a reception gate after a lapse of an image elimination period having a predetermined duration necessary for masking reception of signals due to reflection of waves from an unintended object.

4. The wireless communication method according to claim 3, wherein the ranging signal consists of a single pulse signal or of a plurality of pulse signals.

5. A wireless communication device configured to perform data information communication during a predetermined data communication period portion of a predetermined transmission frame period and to provide a response to a ranging signal received from another wireless communication device during a ranging period portion of said predetermined transmission frame period separate from the data communication period portion, the ranging period portion of said predetermined transmission frame period including an initial portion containing a ranging period portion identifier, the wireless communication device further comprising:

means for detecting the ranging period portion identifier and for preventing processing of a response to a ranging signal for a predetermined masking period of time after detecting the ranging period portion identifier;

ranging signal reception means for receiving the ranging signal from the another wireless communication device during the ranging period portion of said predetermined transmission frame period;

response signal processing means for processing the received ranging signal to generate a response signal to be transmitted after the predetermined masking period of time has elapsed; and response signal transmission means for transmitting the response signal during the ranging period portion of said predetermined transmission frame period indicating reception of the ranging signal a predetermined time after receiving the ranging signal.

6. A wireless communication method for performing wireless data communication during a predetermined data communication period portion of a predetermined transmission frame period and for providing a response to a ranging signal received during a ranging period portion of said predetermined transmission frame period separate from the data communication period portion in a wireless network, the ranging period portion of said predetermined transmission frame period including an initial portion containing a ranging period portion identifier, the wireless communication method comprising the steps of:

detecting the ranging period based on receiving the identifier from a remotely located wireless unit at a local wireless unit and preventing processing of a response to any signal received for a predetermined masking period of time at the local wireless unit;

receiving the ranging signal from the remotely located wireless unit of said wireless network during the ranging period portion of said predetermined transmission frame period separate from the data communication period portion;

processing the received ranging signal to generate a response signal to be transmitted, the processing occurring during the ranging period portion of said predetermined transmission frame period and after the predetermined masking period of time has elapsed; and transmitting the generated response signal during the ranging period portion of said predetermined transmission frame period a predetermined time after receiving the ranging signal.

7. The wireless communication method according to claim 6, wherein the response signal consisting of a single pulse signal or of a plurality of pulse signals.

8. The wireless communication method according to claim 6, wherein the response signal consists of a sequence of a plurality of PN-coded pulse signals.

9. A computer program stored in a computer readable storage medium in a computer-readable form and configured to cause a wireless unit in a wireless network to perform information transmission during a predetermined data communication period portion of a predetermined transmission frame period and to perform a distance measurement between wireless units in the wireless network during a ranging period portion of said predetermined transmission frame period separate from the data communication period portion, the computer program causing the distance measurement between wireless units in the wireless network during the ranging period portion of said predetermined transmission frame period separate from the data communication period portion by controlling the steps of:

performing an operation of transmitting a ranging signal from a first wireless unit to a specific wireless unit in said wireless network during the ranging period portion of said predetermined transmission frame period separate from the data communication period portion;

performing an operation of enabling a reception gate in the first wireless unit to permit the first wireless unit to receive signals only after a lapse of an masking time period having a predetermined duration for preventing reception of signals due to reflection of waves from an unintended object;

performing an operation of receiving a response signal at first wireless unit from said specific wireless unit during the ranging period portion of said predetermined transmission frame period and after the lapse of the masking period, the response signal indicating receipt of the ranging signal by the specific wireless unit; and performing an operation of measuring a distance from the first wireless unit to said specific wireless unit according to an elapsed time from a moment when the ranging signal is transmitted from the first wireless unit to a moment when the response signal is received at the first wireless unit.

10. A computer program stored in a computer readable storage medium in a computer-readable form and configured to cause a wireless network to perform wireless communication including data information transmission during a predetermined data communication period portion of a predetermined transmission frame period and to perform transmission of a ranging signal from one wireless unit in the wireless network to a receiving wireless unit during a ranging period portion of said predetermined transmission frame period separate from the data communication period portion, the ranging period portion of said predetermined transmission frame period including an initial portion containing a ranging period portion identifier, the computer program causing the receiving wireless unit to perform the steps of:

detecting the ranging period based on receiving the identifier from the one wireless unit at the receiving wireless unit and preventing processing of a response to any signal received for a predetermined masking period of time at the receiving wireless unit;

receiving the ranging signal from the one wireless unit of said wireless network at the receiving wireless unit during the ranging period portion of said predetermined transmission frame period separate from the data communication period portion;

processing the received ranging signal to generate a response signal to be transmitted, the processing occurring during the ranging period portion of said predetermined transmission frame period and after the predetermined masking period of time has elapsed; and transmitting the generated response signal from the receiving wireless unit indicating receipt of the ranging signal during the ranging period portion of said predetermined transmission frame period separate from the data communication period portion.

11. The wireless communication method according to claim 3, wherein said response signal being received during the ranging period portion of said predetermined transmission frame period separate from the data communication period portion includes a lapse of a ranging delay time including a delay time caused in a signal processing in said remotely located wireless unit, in addition to a two-way propagation time of a pulse propagating between wireless units at a propagation velocity.

12. The wireless communication method according to claim 6, wherein said transmitting step of the response signal during the ranging period portion of said predetermined transmission frame period separate from the data communication period portion occurs after a lapse of a ranging delay time including a delay time caused in a signal processing in said remotely located wireless unit, in addition to a two-way propagation time of a pulse propagating between wireless units at a propagation velocity.

\* \* \* \* \*